United States Patent
Hohmann et al.

(10) Patent No.: US 8,327,360 B2
(45) Date of Patent: Dec. 4, 2012

(54) MIGRATION OF PROCESS INSTANCES

(75) Inventors: Dennis Hohmann, Steinenbronn (DE); Matthias Kloppmann, Sindelfingen (DE); Andreas Schmitz, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 1327 days.

(21) Appl. No.: 12/024,718

(22) Filed: Feb. 1, 2008

(65) Prior Publication Data

US 2008/0196027 A1 Aug. 14, 2008

(30) Foreign Application Priority Data

Feb. 9, 2007 (DE) .................... 07102015

(51) Int. Cl.
*G06F 9/46* (2006.01)
(52) U.S. Cl. ....................................... 718/100
(58) Field of Classification Search ............. None
See application file for complete search history.

(56) References Cited

U.S. PATENT DOCUMENTS

| | | | |
|---|---|---|---|
| 7,885,847 B2 * | 2/2011 | Wodtke et al. ............. 705/7.26 |
| 2006/0277080 A1 | 12/2006 | Behrendt et al. | |
| 2006/0277082 A1 | 12/2006 | Behrendt et al. | |

FOREIGN PATENT DOCUMENTS

| | | |
|---|---|---|
| EP | 1293924 A | 3/2003 |
| EP | 1643429 A | 4/2006 |

OTHER PUBLICATIONS

Kradolfer, M., et al., Dynamic Workflow Schema Evolution Based on Workflow Type Versioning and Workflow Migration, Cooperative Information System, 1999, COOPIS '99 Proceedings, 1999 IFCIS International Conference, pp. 105-112 (Sep. 2, 1999).

Kradolfer, M. et al., "Dynamic workflow schema evolution based on workflow type versioning and workflow migration," Cooperative Information Systems, 1999, COOPIS '99, Proc. 1999 IFCIS Int'l Conf. on Edinburgh, UK Sep. 2-4, 1999, IEEE Comput. Soc., US, Sep. 2, 1999, pp. 104-114.

* cited by examiner

*Primary Examiner* — Jennifer To
*Assistant Examiner* — Eric C Wai
(74) *Attorney, Agent, or Firm* — Cuenot, Forsythe & Kim, LLC

(57) ABSTRACT

For migrating process instances, first input information describing changes between a first process template and a second process template is received. Second input information describing grouping of said changes is also received. A set of combinations of the first process template and the second process template is determined by applying the changes to the first process template in complete groups as defined by the second input information.

13 Claims, 17 Drawing Sheets

MIGRATION OF PROCESS INSTANCES

BACKGROUND OF THE INVENTION

The present invention relates in general to migration of process instances. In particular, but not exclusively, the present invention relates to migration of process instances in a workflow system.

A workflow system, or a workflow management system (WFMS), provides a foundation for defining and executing business processes. A business process defines tasks that need to be followed in a certain order and subject to certain conditions. As an example of a business process, consider administrative processes such as the handling of an expense account form. An employee needs to fulfill the form and attach necessary receipts. Thereafter the form is routed to the manager for approval, and in the end the accounting department checks the details and reimburses the employee for the approved expenses. All business processes are not of financial nature. Consider, for example, the process of a database administrator for backing up and restoring a database system.

A workflow system provides functionality for defining business processes and for executing them. A business process is represented by a schema (process model), which defines a set of activities corresponding to the real-life tasks. The schema defines also the order in which the activities are to be executed and the conditions for executing a certain activity. The activities may represent either tasks conducted by software or tasks conducted by users. Different equipment with different software can be used to perform the tasks.

FIG. 1 shows, schematically, most relevant parts of a workflow system. A schema is created in an editor 101 and stored in a schema store 102, called Repository in FIG. 1. A user can create the schema, for example, using a specific workflow definition language, such as Business Process Execution Language (BPEL). The schemas may be created and stored beforehand, and then deployed to a template store 104 in a deployment step 103. A deployed process schema is usually also called a process template. At runtime, the workflow engine 105 reads the template information 104, creates and stores instance data to an instance data repository 106 and navigates the process instances.

The deployed schema (template) storage 104 may contain multiple versions 107 of a schema. The workflow engine 105 may navigate instances for each of these template versions with different states 108. In this versioning approach a process instance 108 is always bound to the version of the process template 107 that it was created for.

The versioning approach is not very flexible because of the strong association from process instances to process templates. When a process schema is modified, and deployed as an additional process template version, the existing process instances are insensitive to the modifications, even if the modifications might be relevant also for already existing process instances. Other approaches, such as schema-evolution and ad-hoc workflow, do not have this association. Using these approaches, if a process instance is migrated to a new version of the process template, the process instance is associated with multiple templates. This has several different problems: With ad-hoc approaches, each process instance needs to be dealt with individually, creating a significant handling problem in a production system with large numbers of concurrent process instances, and a large number of process templates, one per process instance. With current schema evolution approaches, on the other hand, in order to ensure consistency of the changes so that all the process instances stay in accordance with the general objectives behind the changes, they impose very restrictive rules about the nature of changes, effectively preventing the migration of existing process instances to a new process template version for many practically relevant cases.

Migration of process instances was discussed above in connection with workflow systems, but the migration of process instances may be relevant also in other information technology systems and applications.

Embodiments of the present invention aim to provide a new, more flexible approach that allows to automatically migrate process instances to an updated process template for many practically relevant cases, while not requiring to touch each process instance individually.

SUMMARY OF THE INVENTION

A first aspect of the invention provides a computerized method for migrating process instances, the method comprising: receiving first input information describing changes between a first process template and a second process template, receiving second input information describing grouping of said changes, and determining a set of combinations (of said first process template and said second process template by applying said changes to said first process template in complete groups as defined by said second input information.

The method may comprising migrating at least one instance of said first process template to a respective combination of said set of combinations, said respective combination containing complete groups of changes defined by said second input information that affect only future of said at least one instance at the time of migration.

It is furthermore possible to determine for at least one instance of said first process template whether a current state of said instance crosses groups of changes defined by said second input information. If needed, said instance of said first process schema may be navigated to a further state not crossing any one of said groups of changes.

Said second input information may define at least one partial group boundary. For example, said at least one group boundary may be defined by at least one set of concurrently navigatable activities. It is possible to determine at least one group boundary extending across said first process template based on said at least one partial group boundary. It is furthermore possible to determine for each group boundary extending across said first process template a respective combination of said first process template and said second process template.

As a further option, said second input information may define at least all changes belonging to each group of changes.

A graphical user interface may be provided for inputting at least one of the following: said first input information, and said second input information.

Said first input information and said second input information may be provided as one piece of input information.

A second aspect of the invention provides a data processing system comprising a template storage for storing at least a first process template; and a combination generator for receiving first input information describing changes between said first process template and a second process template and for receiving second input information describing grouping of said changes, said combination generator configured to determine a set of combinations of said first process template and said second process template by applying said changes to said first process template in complete groups as defined by said second input information.

Also a computer program product in line with the method of the first aspect of the invention is provided.

BRIEF DESCRIPTION OF THE DRAWINGS

For a better understanding of the present invention and as how the same may be carried into effect, reference will now be made by way of example only to the accompanying drawings in which:

FIG. 13 shows, using the graph representation as an example, complete sets of activities navigatable in parallel based on the partial sets of activities navigatable in parallel shown in FIG. 12a;

DETAILED DESCRIPTION OF THE INVENTION

Migration of process instances is discussed in the following mostly in connection with workflow systems, but embodiments of the invention may be applied also in other information technology systems and applications.

In this description and in the appended claims, the following terms are used. The term activity refers to an activity carried out by a computer or by a human. An activity is the basic building block of a process schema (process model). The term process schema refers to a set of activities, conditions to be fulfilled for executing the activities, and how the activities are linked to each other. The term process template refers to a deployed process schema. The term process instance refers to an instantiation of the process template. For example, there is a process instance for each copy of a travel expense form to be handled.

In this description, a graph having activities and links connecting the activities is used for representing process schemas, process templates and process instances. The graph presentation is not intended to be restrictive, and it is appreciated that any other representation, for example a block oriented description of a process, is equally suitable.

Figure 1:
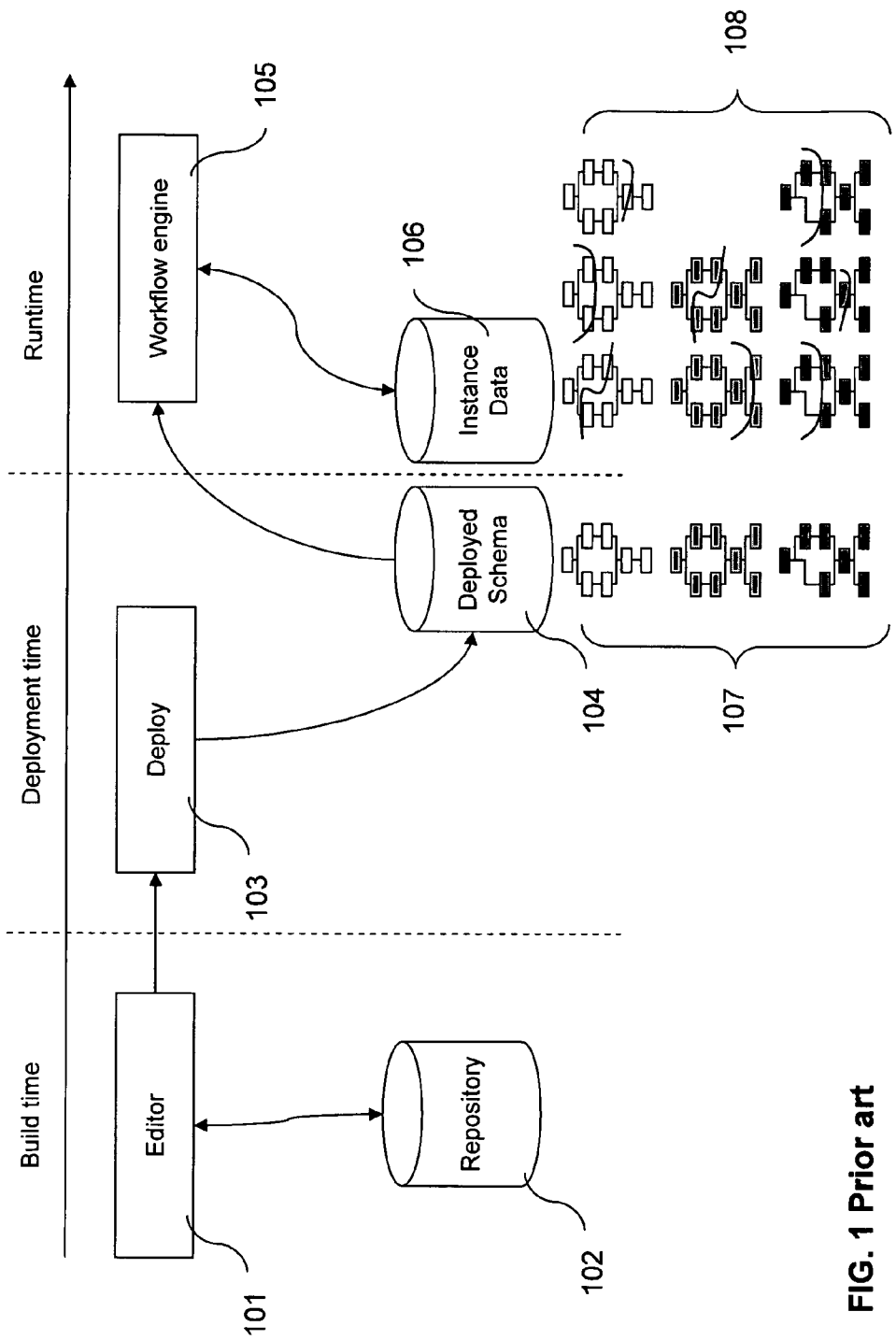
FIG. 1 shows schematically, as an example of a known solution, versioning approach to processes in a workflow system.
Figure 2:
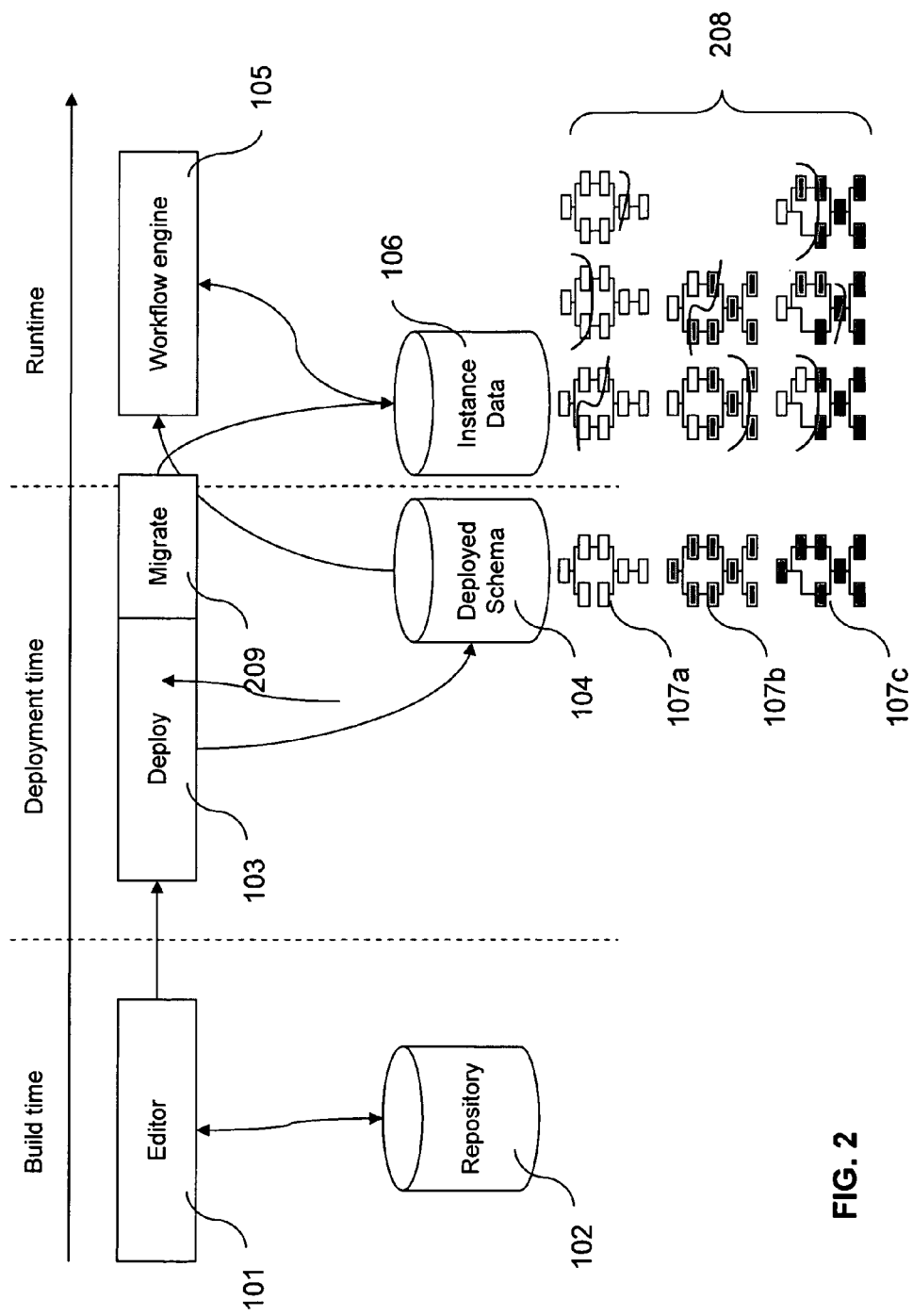
FIG. 2 shows schematically, as an example, migration of process instances in accordance with an embodiment of the present invention.

FIG. 2 shows schematically, as an example, migration of process instances in accordance with an embodiment of the present invention. In addition to the functionality already discussed in connection with FIG. 1, the workflow system in FIG. 2 contains a migration block 209. The migration extends the deployment 103 into the runtime. A new version of the process schema is created with the editor 101 and deployed and stored to the deployed schema (template) storage 104. Thereafter the migration block 209 reads the information describing the changes to the process template and modifies the process instances 208 where applicable. Information about the modified process instances is stored in the instance data storage 106. The workflow engine 105 then navigates the modified process instances 208.

Embodiments of the present invention allow migration of process instances from one process template to another. A migrated instance is no longer associated with only one process template, but with multiple versions of the process template. This is indicated in FIG. 2 with the coloring of the process instances 208. Some of the process instances follow the original process template 107a. Some of the process instances have been initiated with the process template 107a (white color), but they continue with the changes associated with the process template 107b (grey color). Some process instances are related to three process templates: they have been initiated with the original process template 107a, then first changes of the process template 107b (grey color) have been applied to these process instances and thereafter changes associated with the process template 107c (dark grey color).

In order to identify changes to the structure or the activities of a process schema, a suitable activity identification scheme is used that preserves the identity of an activity across multiple versions of that process schema. Some example identification schemes are direct identification through unique activity identifiers or qualified activities names, or indirect identification through path expressions or via control links leading to/from an activity. Such identification could also be automatically derived, e.g., by structurally analyzing and comparing two versions of a process schema, though in practice it is typically provided by the process schema editor 101.

In the following it is assumed that changes to a process schema are described using a language. Some examples of languages that could be used are the Workflow Markup Language (WFML) and ADEPTflex. A user may define the changes directly using such a language, or the description of the changes can be generated, for example, by the editor 101 based on graphical input by the user. It is appreciated that changes to the process schema can be defined, for example, as changes to the existing process schema or by describing the new process schema and inferring the differences between the old and new process schemas. Once deployed, the changes of a process schema also apply to its deployed version, so the creation of process schema changes effectively also creates process template changes.

The possible combinations of old and new process templates for process instances are discussed next. It is appreciated that a combination may be associated with more than two process template. In the following, a combination of the process templates is referred to as a stitched model. For facilitating the discussion of the stitched models, a set of activities navigatable or navigated in parallel is first defined and discussed. This concept is called also a wave-front in the following discussion. A set of activities navigatable in parallel (template wave-front) applies to process templates, and a set of activities navigated in parallel (instance wave-front) applies to process instances.

Figure 3:
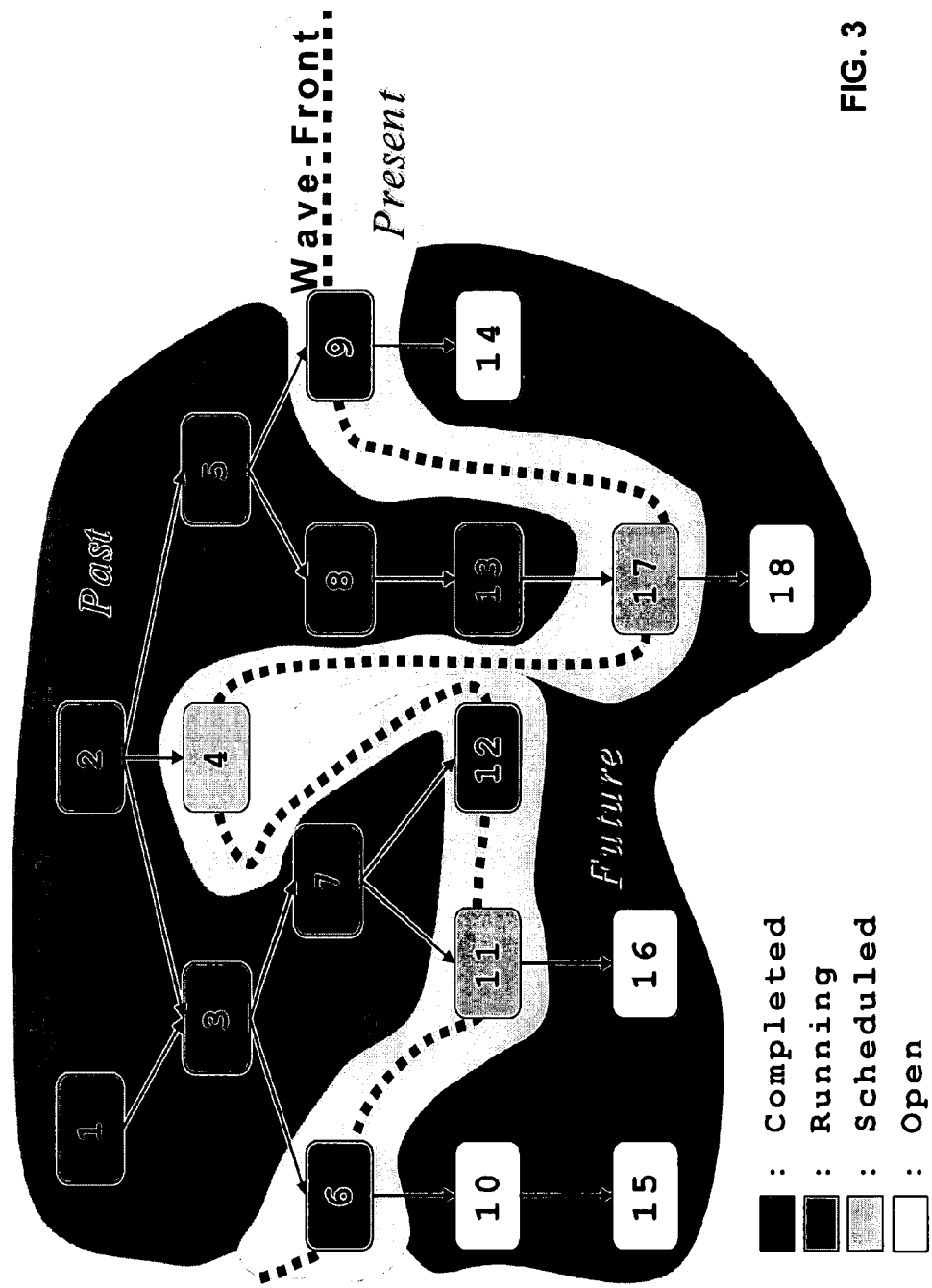
FIG. 3 shows, using a graph representation as an example, a set of activities navigated in parallel in a process instance for illustrating concepts relating to the present invention.

FIG. 3 shows, using a graph representation as an example, a set of activities navigated in parallel in a process instance or, in other words, an instance wave-front. The set of all nodes of an instance that are currently being performed ("running") or that are already identified by the workflow system to be able to be performed next ("scheduled") is called the wave-front of the instance. In FIG. 3, the identifiers of the activities are numerals from 1 to 18. The wave-front (indicated by the dashed line in FIG. 3 and containing activities 6, 11, 12, 4, 17 and 9) represents the set of nodes requiring special care about template changes that can be supported in order to migrate the instance. The wave-front represents "the present" of the instance, while the "completed" nodes or "dead" nodes of the instance (including the transitive predecessors of the nodes of the wave-front) represent "the past" of the instance, and the transitive successors of the nodes of the wave-front represent "the future" of the instance. Note that while the past, present and future of an instance is defined via predecessor/successor relationships here, it could also be defined by other means, e.g., through the activity states. In case of loops only the actual iteration is regarded, because previous iterations are entirely in the past and hence need not be considered.

Template changes that affect only the future of an instance are not critical and can be applied without affecting the ability to migrate the instance. Template changes that affect only the past of an instance are not applied; the past of a process instance is accepted as a given and hence no attempt is made to return a process instance to an earlier state and re-execute from there (which would neither be practical nor consistent with typical enterprise business policies). There are two special cases for these rules. Firstly, at the time an instance is created all nodes are in the future, and the template can still be changed arbitrarily. This means that the template associated with the created instance is the new template. Secondly, at the time an instance is completed all nodes are in the past and no template changes are allowed at all. The template associated with the already completed instance is the old template.

At any other time, an instance is associated with a combination of the old template and the new template. As a rule of thumb, the part of the instance lying in the past is associated with the corresponding fragment of the old template; the part of the instance lying in the future is associated with the corresponding fragment of the new template. Both template fragments are stitched together at the migration line. The resulting combination model is called the stitched model associated with the instance. All instances of a template with the same instance wave-front are associated with the same stitched model. In simple cases, the migration line is at the present of the instance and thus defined by the instance wave-front.

Figure 4:
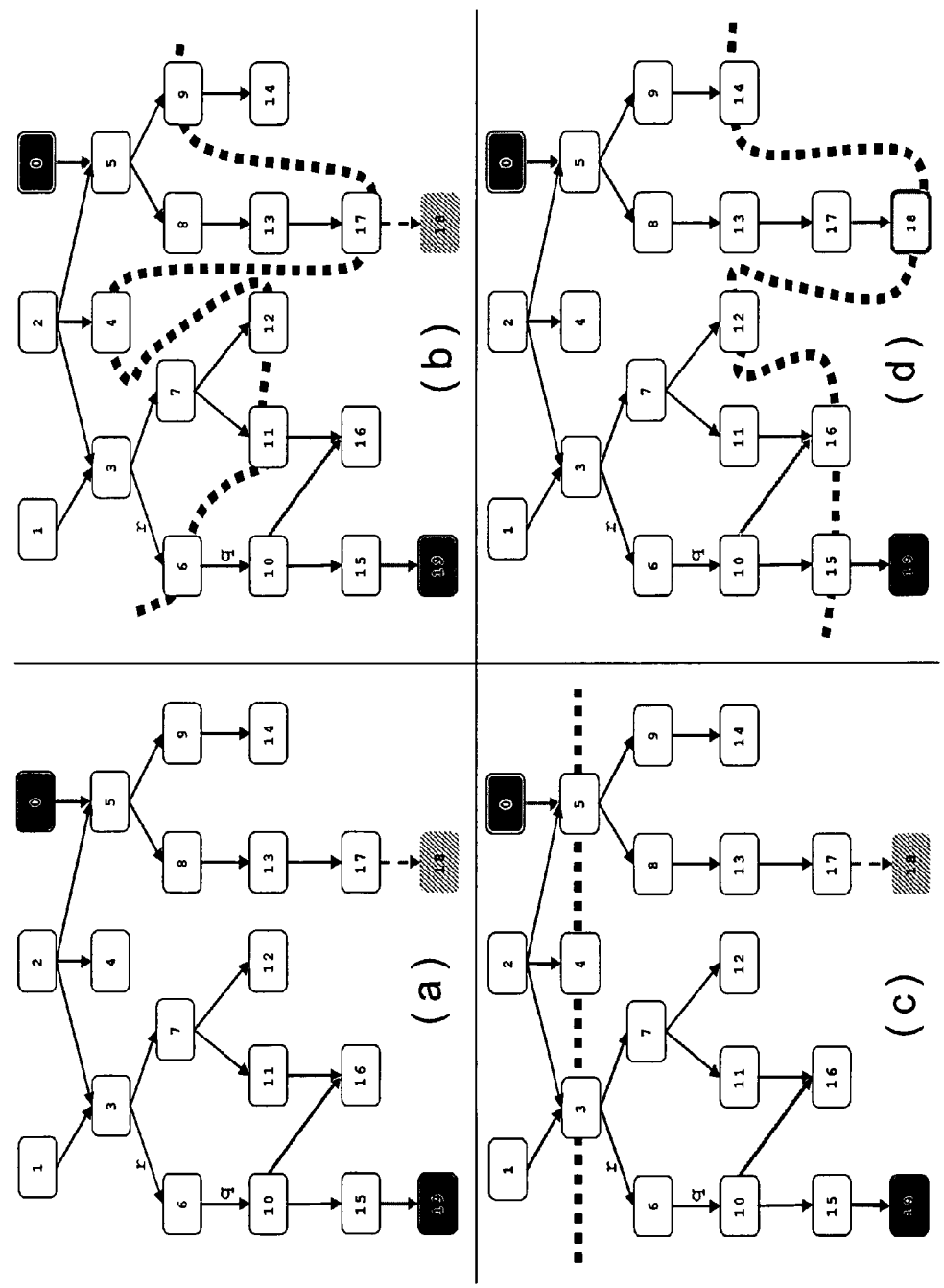
FIG. 4 shows, using the graph representation as an example, in panel (a) changes to a process schema in FIG. 3 and in the other panels various combination schemas resulting from the changes.

FIG. 4 shows, using the graph representation as an example, in panel (a) changes to a process template associated with FIG. 3 and in the other panels various combination templates resulting from the changes. As the panel (a) in FIG. 4 shows, nodes 0 and 19 have been added to the template shown in FIG. 3 together with corresponding links. Node 18 has been removed as well as its adjacent link, and a link connecting nodes 10 and 16 has been added. The transition conditions of the links connecting nodes 3 and 6 as well as connecting nodes 6 and 10 have been modified.

In panels (b), (c) and (d) three process instances together with their instance wave-fronts (dashed lines) and their associated stitched models are shown. In panel (b), node 0 as well as its adjacent link is not in the stitched model because this addition is part of the past. Similarly, transition condition r is not changed. All other changes are applied. In panel (c), all changes are applied except for adding node 0 and its adjacent link. In panel (d), the stitched model does only reflect the addition of node 19 and its adjacent link. All other changes are in the past or affect how the present came into existence.

When using the stitched model approach to realize instance migration and ad-hoc scenarios in more complex cases, the following problems need to be dealt with. One problem is complexity: for many instances with many individual wave-fronts, the user deals with a potentially large set of stitched models. Another problem are the dependencies between the changes: In general modifications may depend on each other, e.g., because one activity produces information consumed by another activity. (For example, consider inserting an activity A1 writing a value to a variable V and inserting a second activity A2 reading the value from V. A2 works correctly only if A1 was executed before A2, and therefore a stitched model for an instance wave-front between A1 and A2 will cause failures during navigation.) A third problem are mismatches between old and new template at the current wave-front, preventing immediate transition to the new template. All those problems are solved by migrating a process instance to a new process template version only at certain suitable migration lines, thus reducing the number of possible combinations of old and new process templates to only those stitched at those migration lines.

In order to determine which migration lines are feasible, information about grouping of the changes into non-divisable units is needed; either all constructs of a group must be executed, or none of the constructs. Grouping can be defined at least in two ways: either by defining group boundaries, or by listing members (activities) of groups. In this description, two examples of grouping the changes are discussed: template wave-fronts (an example of defining group boundaries) and spheres of modification (an example of listing group members). As a further example, it is possible to mix group boundary information and listing activities belonging to the groups. It is appreciated that further approaches for grouping of the changes may well be possible and that these examples should not be construed as limitations of the present invention.

A user may input the information describing the groups, for example, by grouping the changes involving dependent constructs together using a drawing tool in a graphical interface or by specifying the groupings using a language, such as BPEL extensions or any other language suitable for describing process templates and, especially, changes to process templates. Each group (or, in case the group consists of multiple non-connected graphs, each connected sub-graph of each group) must contain activities present in both the old and the new process template as its first and last activity (this implies they are unchanged activities).

In the following, we provide a number of definitions to more precisely define grouping based on potential (partial) migration lines called template wave-fronts, and the conditions that most hold to create valid groups.

Figure 5:
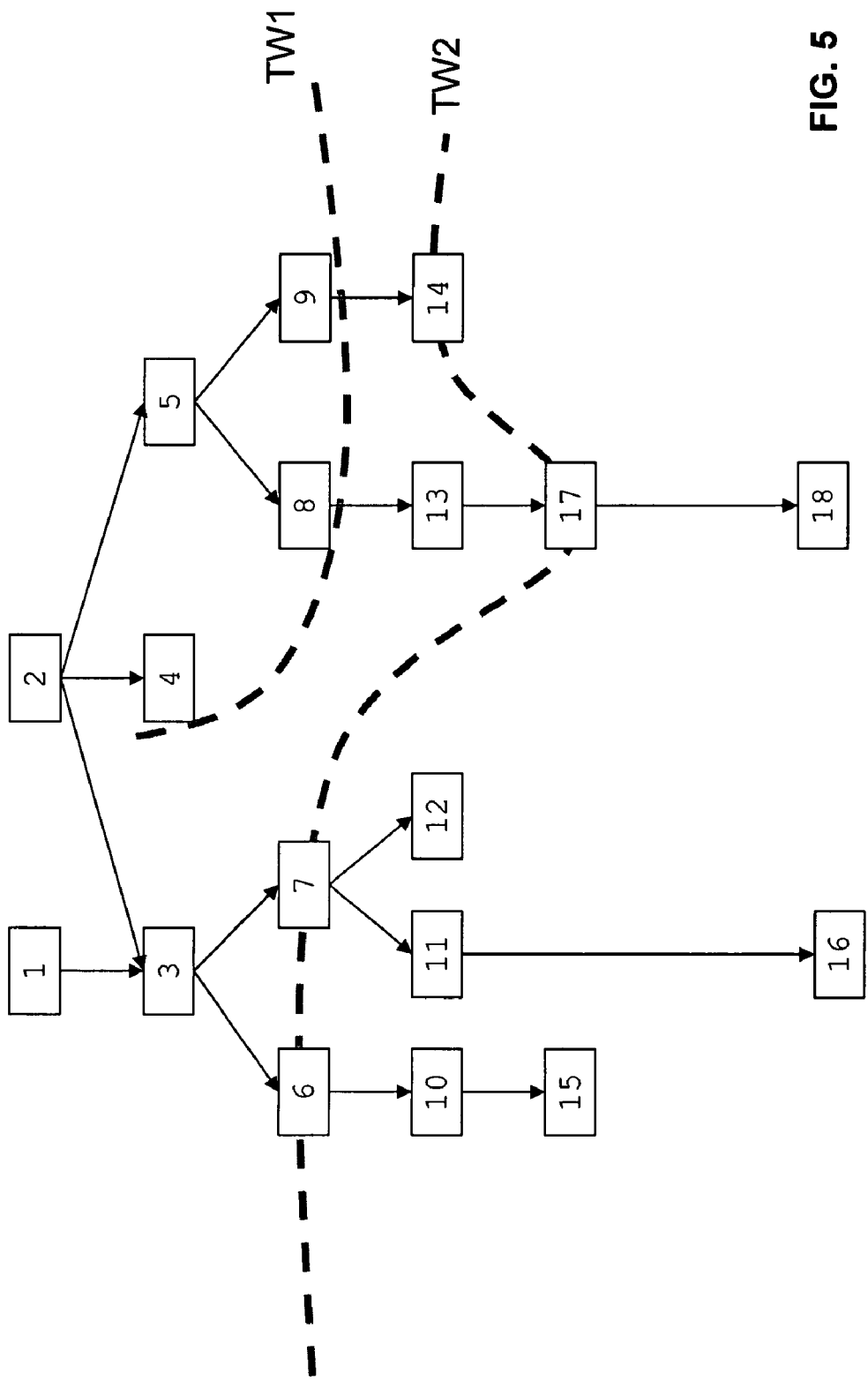
FIG. 5 shows, using the graph representation as an example, two sets of activities navigatable in parallel in the process schema in FIG. 3.

FIG. 5 shows, using the graph representation as an example, two sets of concurrently navigatable activities or, in other words, two template wave-fronts. The process template in FIG. 5 is the same as in FIG. 3. The set TW1={4, 8, 9} of activities defines a partial template wave-front because adding, for example, activity 3 to TW1 will define a larger template wave-front. The set TW2={6, 7, 17, 14} of activities defines a complete template wave-front, because it is not possible to add to the set TW2 any other activity that can be executed concurrently to all of the activities in TW2. A partial template wave-front is thus defined as a set of activities that can be navigated concurrently. A complete template wave-front is defined as a complete set of activities that can be navigated concurrently.

Figure 6:
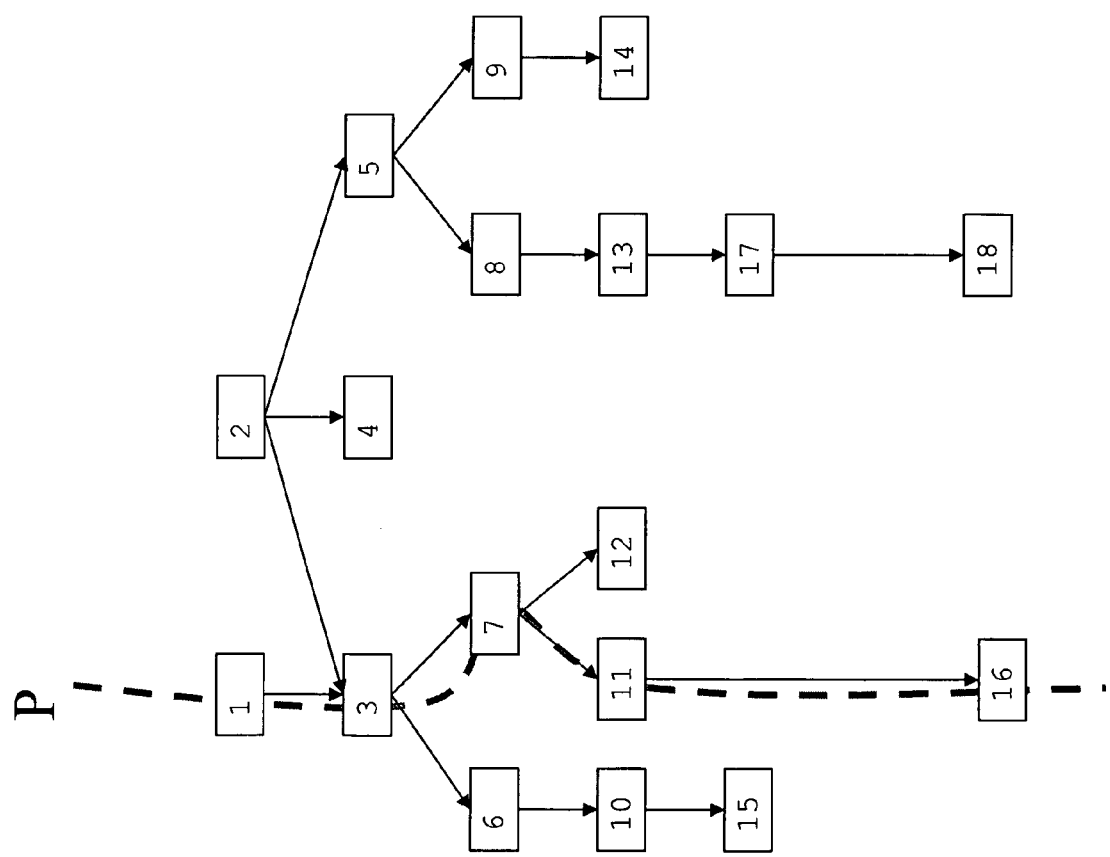
FIG. 6 shows, using the graph presentation as an example, a path through a process schema.

FIG. 6 introduces a further concept, namely a path through a process template, using the graph presentation as an example. A path P through a process is defined as a sequence of activities that potentially can be navigated sequentially. That is, for each activity A out of P, exactly one predecessor (if exists) and exactly on successor (if exists) is also contained in P. FIG. 6 shows a path P={1,3,7,11,16}.

Figure 7:
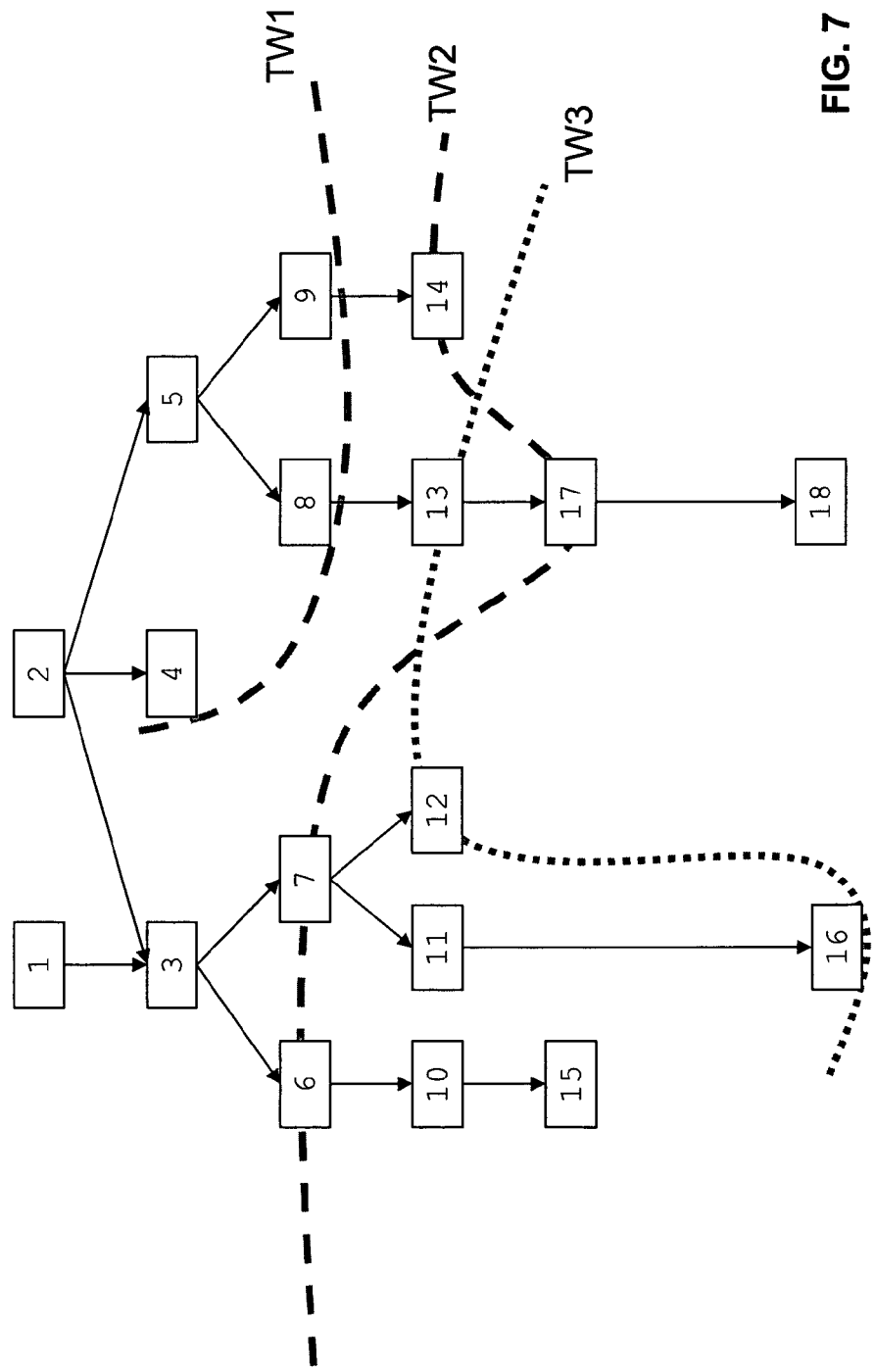
FIG. 7 shows, using the graph presentation as an example, parallel and non-parallel sets of activities navigatable in parallel in a process schema.

FIG. 7 introduces, again using the graph presentation as an example, the concepts of parallel and non-parallel sets of concurrently navigatable activities in a process template. In FIG. 7, template wave-fronts TW1 and TW2 are parallel, and so are template wave-fronts TW1 and TW3. However, template wave-fronts TW2 and TW3 are not parallel. As a definition, two disjoint wave-fronts $W_1$ and $W_2$ are called parallel, if $W_1$ contains only activities that are (transitive) predecessors of activities in $W_2$ (this is equivalent to $W_2$ only containing (transitive) successors of activities in $W_1$).

Figures 8A, 8B:
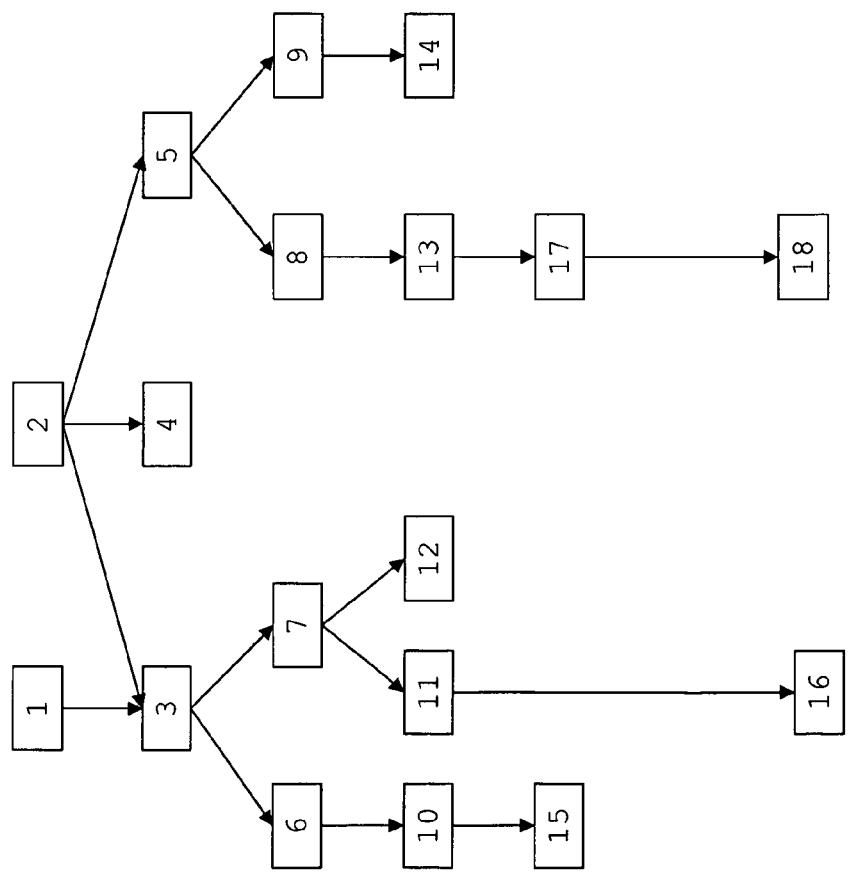
FIGS. 8a and 8b show, as an example, a graph presentation of a process schema and a corresponding matrix representation.

It is possible to use wave-fronts and paths for determining feasible stitched models. An intuitive definition is that a wave-front W is crossing a path P if there exists an activity A in W that is also in P. Note that a wave-front that contains an activity A crosses all paths that also contain A. One possibility to visualize this is a matrix representation of the process, where each path is a column in the matrix. Each cell of the matrix contains an identifier of an activity on that path. Wave-fronts then can be noted by marking all cells that contain identifiers of activities in that wave-front. FIGS. 8a and 8b show respectively, as an example, a graph presentation of a process template in FIG. 3 and a corresponding matrix representation listing the paths in the process template.

(Partial) Template wave-fronts are one option for grouping changes on a process template. A group of changes is applied in an all-or-nothing semantic: either all of the contained constructs are executed, or none of them. Note that the user needs to define at least one wave-front for grouping. The two trivial wave-fronts, one having all starting activities and the other having all end activities, can be used. A partial template wave-front defines a point where migration is allowed to occur for certain paths, those crossing that partial wave front. That way, all changes between two wave-fronts on a certain path are grouped, and therefore all changes on all paths through those two wave-fronts are grouped, because the migration to the stitched model occurs either at the wave-front before the changes or at the wave-front after the changes.

Two partial template wave-fronts can be used to group changes, when they fulfill the following conditions:

The partial template wave-fronts exist in both—the old and the new—models. This condition implies that only unchanged activities can be part of a wave-front used for grouping changes.

The partial template wave-fronts are parallel in both models.

The partial template wave-fronts cross the same navigation paths.

These conditions can be checked very efficiently, for example, with the matrix representation discussed above.

Figures 9A, 9B:
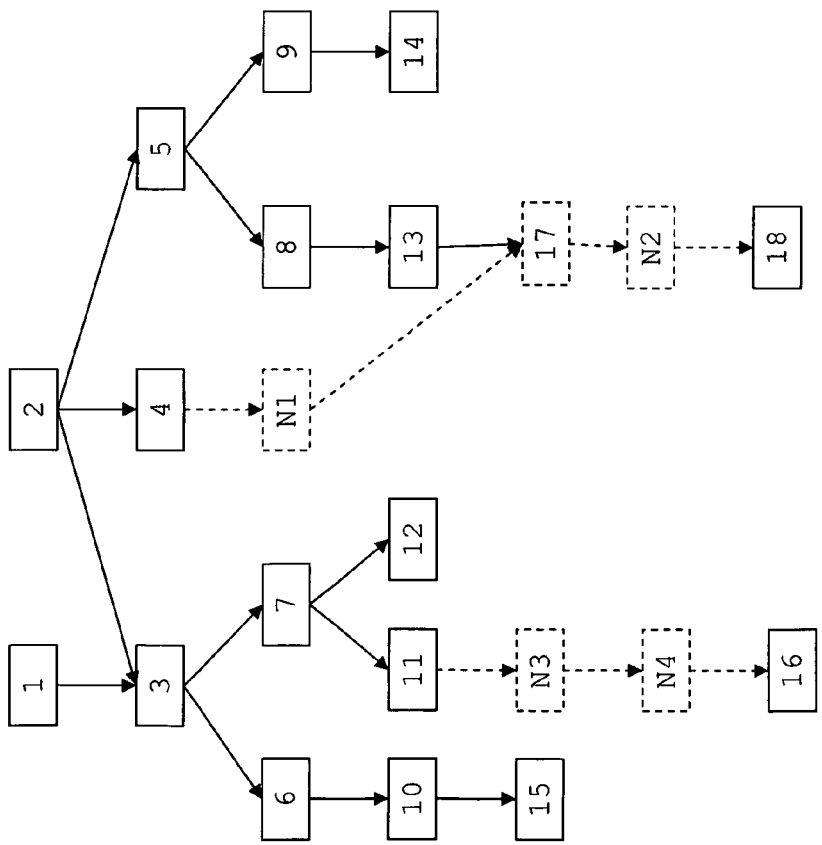
FIGS. 9a and 9b show, as an example, a graph presentation and a matrix presentation of the process schema in FIGS. 8a and 8b with modifications.

As an example, FIGS. 9a and 9b show a graph presentation and a matrix presentation of the process template in FIGS. 8a and 8b with modifications. The example in FIGS. 9a and 9b shows a process with inserted activities N1, N2, N3 and N4 and some inserted Links. Activity 17 is also marked as changed, because the join condition changes.

Figures 10A, 10B:
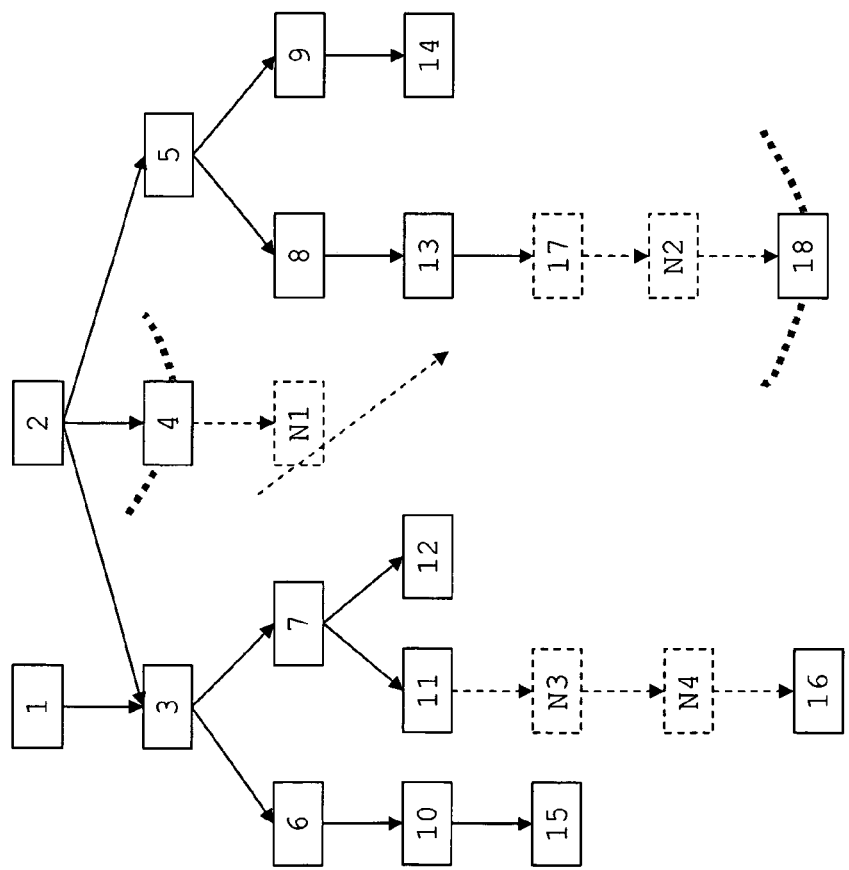
FIGS. 10a and 10b show, as examples, sets of activities that cannot be used for grouping the changes introduced in FIGS. 9a and 9b.

FIGS. 10a and 10b show, as examples, two sets of activities (partial template wave-fronts) {4} and {18} that can NOT be used for grouping the changes N1, 17, N2 introduced in FIGS. 9a and 9b. Both wave-fronts {4} and {18} are parallel (Condition 1), and they exist in the old and the new model (Condition 2). However, as FIG. 10b shows, the two wave-fronts do not cross the same paths: activity 4 exists only in one column while activity 18 exists in two columns. The problem here is that even if an instance for the old template stops navigation for path {2,4} at 4 and migrates to new template, the path {2,5,8,13,17,18} could have already navigated to the end.

Figures 11A, 11B:
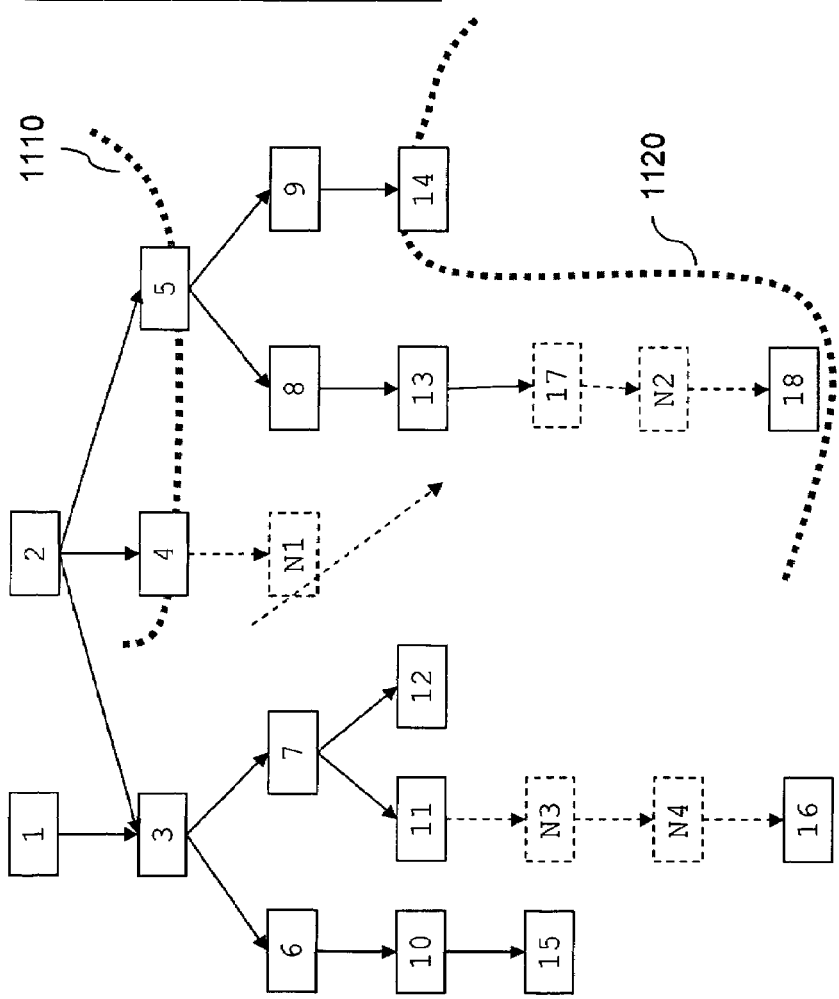
FIGS. 11a and 11b show, as examples, set of activities that can be used for grouping the changed introduced in FIGS. 9a and 9b.

FIGS. 11a and 11b show, as examples, set of activities (partial template wave-fronts) {4, 5} and {14, 18} that can be used for grouping the changes N1, 17, N2 introduced in FIGS. 9a and 9b. These partial template wave-fronts are marked in FIG. 11a with dashed lines and reference numerals 1110 and 1120, respectively. The partial template wave-fronts {4, 5} and {14, 18} can be used for grouping, because Condition 3 above is also fulfilled. That is, migration of an existing process instance either occurs at {4,5} and the stitched model contains the changes, or migration happens at {14,18}, and the stitched model does not contain the changes. In the example shown in FIG. 9a, it is possible also to use a partial template wave-front {4,8,9} or {4,13,9} instead of {4,5} to group the changes.

The potential target stitched models for instance migration can be calculated by creating a set of "completely derived template wave-fronts" based on the (partial) template wave-fronts input by a user. A template wave-front D is called derived from a partial template wave-front W if W is a subset of D. A template wave-front D is called completely derived from a set of partial template wave-fronts $\{W_1, \ldots, W_n\}$ out of a set of predefined partial template wave-fronts $W_P$, if no other predefined partial template wave-front W out of $W_P$ exists where W is different from $W_1, \ldots, W_n$, no other template wave-front $D_C$ exists, which is derived from $\{W_1, \ldots, W_n, W\}$.

In other words, a complete template wave-front extends across a process template and contains the activity of the partial wave-front (specified by the process modeler to delimit a group of changes).

Two (completely) derived wave-fronts are called equivalent, if they are derived from the same set of predefined template wave-fronts. Each completely derived wave-front can be used as a migration line, i.e., there exists a unique stitched model. It is obvious that the stitched models for equivalent completely derived wave-fronts are equal. To calculate all possible stitched target models, it is sufficient to calculate a complete set of non-equivalent completely derived template wave-fronts based on the grouping information.

Figures 12A, 12B:
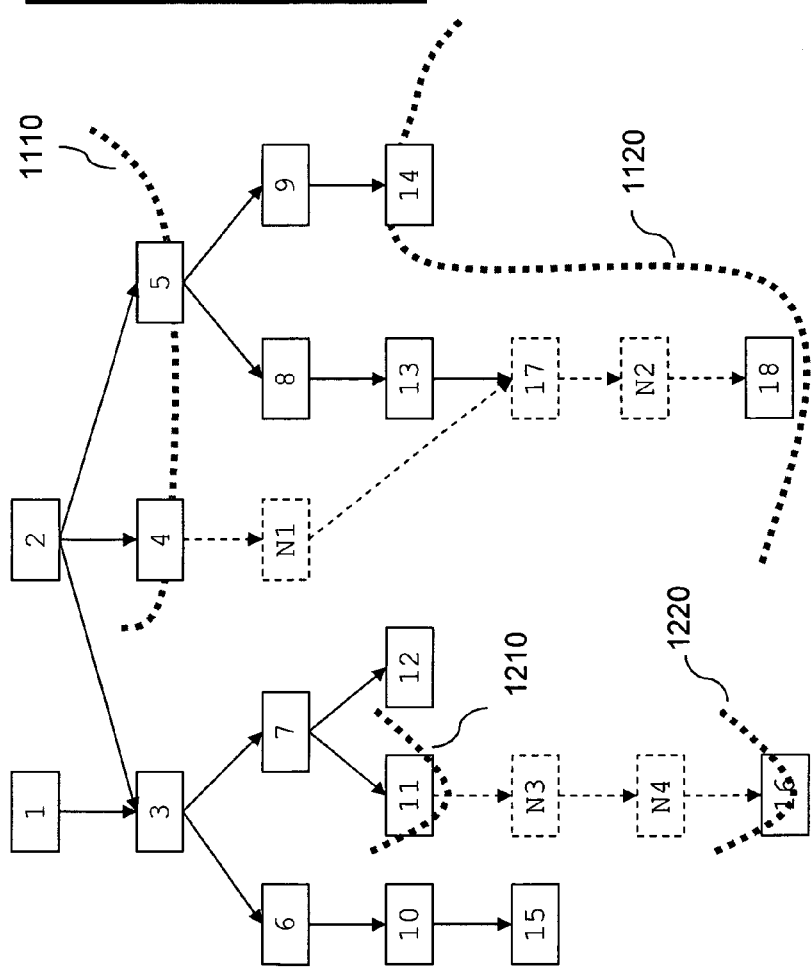
FIGS. 12a and 12b show, as a further example, sets of activities for grouping the changes introduced in FIGS. 9a and 9b.

FIGS. 12a and 12b show, as a further example, sets of activities to group the changes introduced in FIGS. 9a and 9b. In FIG. 12a, the activities N3 and N4 are grouped together by user-defined partial template wave-fronts {11} and {16}. These partial template wave-fronts are marked in FIG. 12a with dashed lines and reference numerals 1210 and 1220, respectively. The partial template wave-fronts {4, 5} and {14, 18} shown in FIG. 11a are also present in FIG. 12a.

Figure 13:
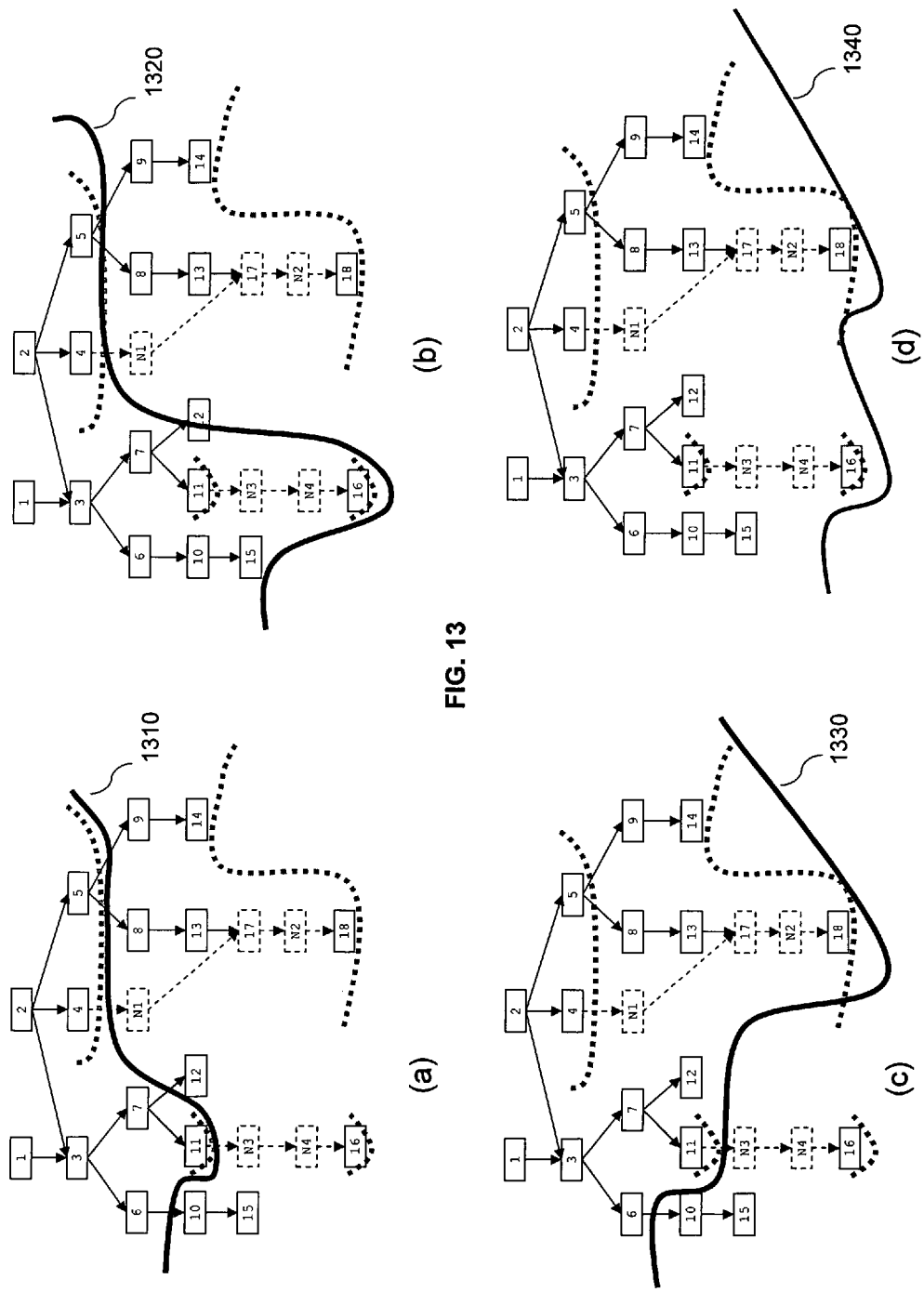

FIG. 13 shows, using the graph representation as an example, complete sets of concurrently navigatable activities (complete derived template wave-fronts) based on the partial sets of concurrently navigatable activities (partial template wave-fronts) shown in FIG. 12a. The user-defined partial template wave-fronts of FIG. 12a imply four complete derived template wave-fronts. These completely derived template wave-fronts are marked with thick solid lines and reference numerals 1310, 1320, 1330 and 1340 in panels a) to d) of FIG. 13. These complete derived wave-fronts imply the stitched models that can be potential target templates for instance migration.

Figure 14:
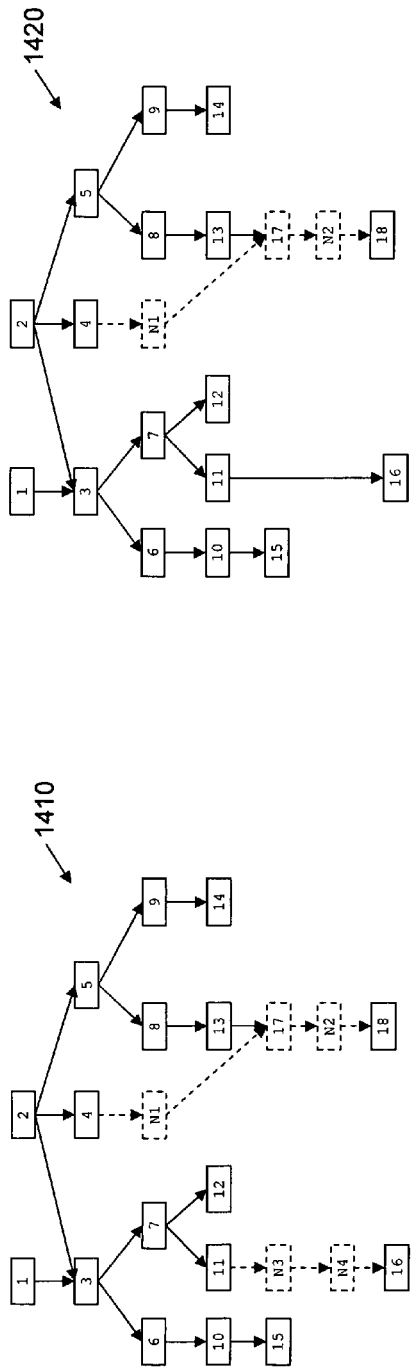
FIG. 14 shows, using the graph representation as an example, different possible combinations of process schemas associated with the complete sets of activities navigatable in parallel shown in FIG. 13.
Figure 14:
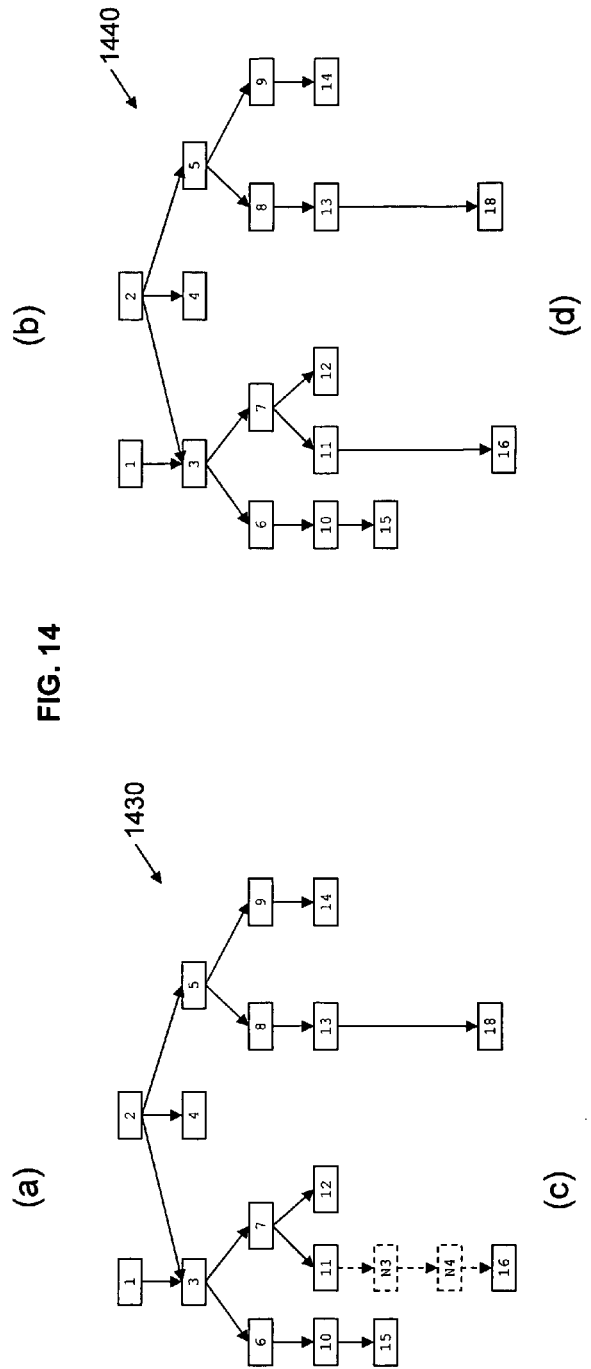

FIG. 14 shows, using the graph representation as an example, the four different possible combinations (stitched models) of process templates associated with the complete sets of concurrently navigatable activities (complete derived template wave-fronts) shown in FIG. 13. These four stitched models are shown in FIG. 14, where panel a) shows the new template 1410 where all changes applied. Panel d) shows the old template 1440, where no changes are applied. In the stitched model 1420 in panel b), activities N3 and N4, which were grouped together, have been added and the other changes, which were also grouped together, have not been applied. In the stitched model 1430 in panel c), activities N3 and N4 have not been added, but the other changes have been applied.

Figure 15:
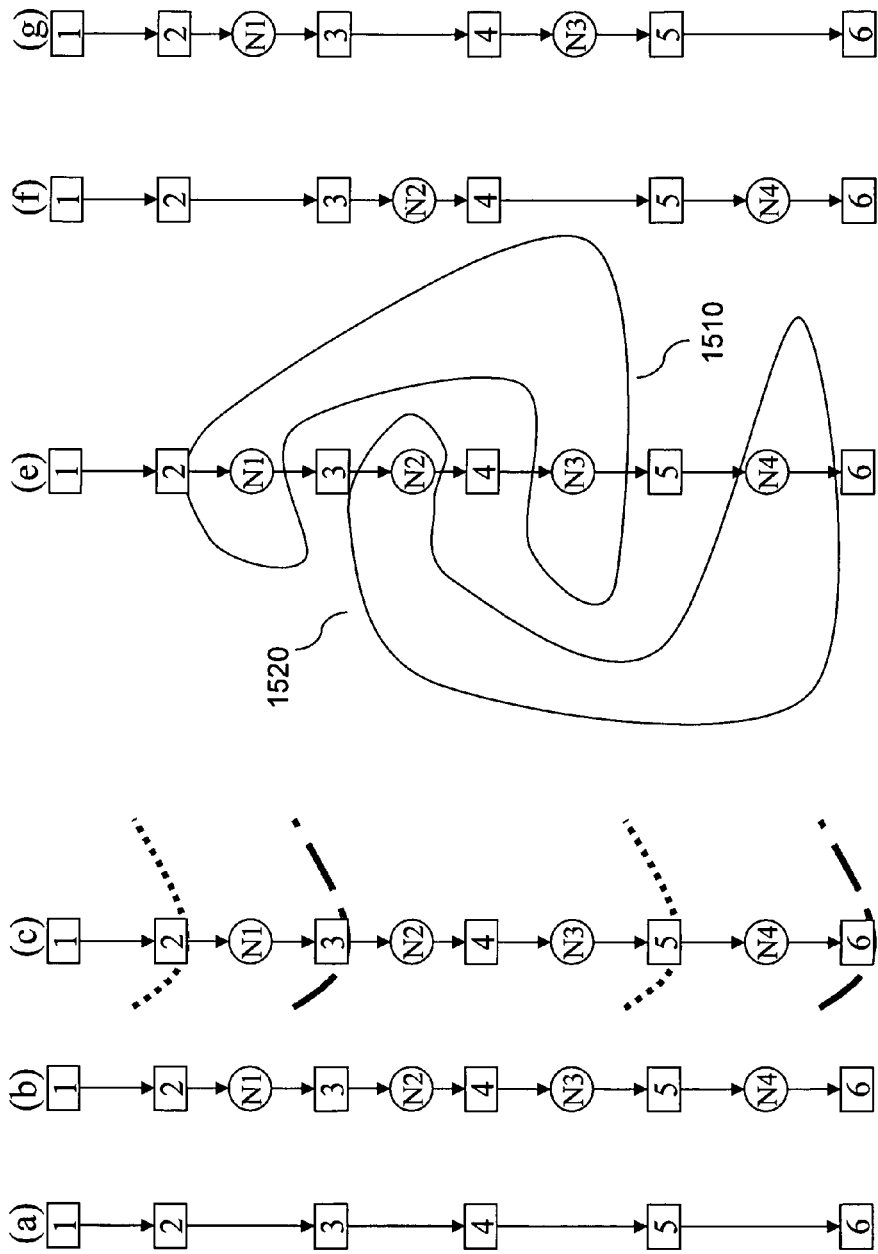
FIG. 15 shows, using the graph representation as an example, a further option for grouping changes to a process schema.

FIG. 15 shows, using the graph representation as an example, a further option supporting more advanced grouping of changes to a process template. Instead of grouping areas in the graph or otherwise providing group boundary information, it is possible to group changes explicitly together. For example, it is possible to group "commands" in the language that describes the modification of a process. In this specific example, information about changes to the process template and about grouping of the changes is provided as a single piece of input information. It is appreciated that other methods, for example, grouping the changes together using tools provided by a graphical interface, are also possible.

Grouping changes explicitly together requires a slightly different stitched model that grouping by partial template wave-fronts or, more generally, by group boundaries. By definition, the stitched model to which a certain process instance is migrated contains only changes in the future of the instance. The changes in the past are not applied to the instance. The template wave-front approach therefore allows migration before a set of dependent changes or after a set of dependent changes. Explicitly defining which activities belong to which group allows migrating at points "in between" two dependent changes, but only those changes are applied to the future of an instance that do not rely on a change in the past.

The scenario in FIG. 15 makes the differences obvious. Panel (b) of FIG. 15 shows a process template that is derived from the process template in panel (a) by inserting activities N1, N2, N3 and N4. If N3 depends on N1 and N4 depends on N2, there is need to group the changes. With the template wave-front approach, wave-fronts {2} and {5} can be used to group N1 and N3 and wave-fronts {3} and {6} can be used to group N2 and N4. This results in grouping all for changes N1, N2, N3 and N4 between wave-fronts {2} and {6}. The resulting stitched models are either as shown in panel (a) (no change applied) or in panel (b) (all changes applied). This grouping with template wave-fronts may be too restrictive, for example, for instances that have already navigated to activity 3.

Panel (e) of FIG. 15 shows two separate groups where changes [N1, N3] are in one group 1510 and changes [N2, N4] are in another group 1520. These groups of changes can be applied independently. For a process instance that has navigated to {3}, the resulting stitched model would be as shown in panel (f) of FIG. 15. Instances that have navigated to {2} would be migrated to the stitched model shown in panel (b), while instances with a wave-front {5} would stay on the original template shown in panel (a). For completeness: the two separate groups of changes shown in panel (e) would also allow grouping and migration as shown in panel (g).

As we've outlined on the previous pages, grouping of changes is introduced to address a number of important practical problems occurring when process instances are migrated from one process template version to another, such as dependencies between multiple changes, structural mismatches between old and new version at the present state of a process instance, or an explosion of the number of stitched models if immediate migration is performed. The target stitched models can be derived from the groups of changes as follows. Based on the instance wave-front, a group of changes can or cannot be applied to the instance, that is, the instance can or cannot be migrated to a stitched model that contains the changes. For N groups of changes, there are up to $2^N$ target stitched models. The $2^N$ target stitched models contain all possible combinations of groups either applied or not applied to the original process template.

Figure 16:
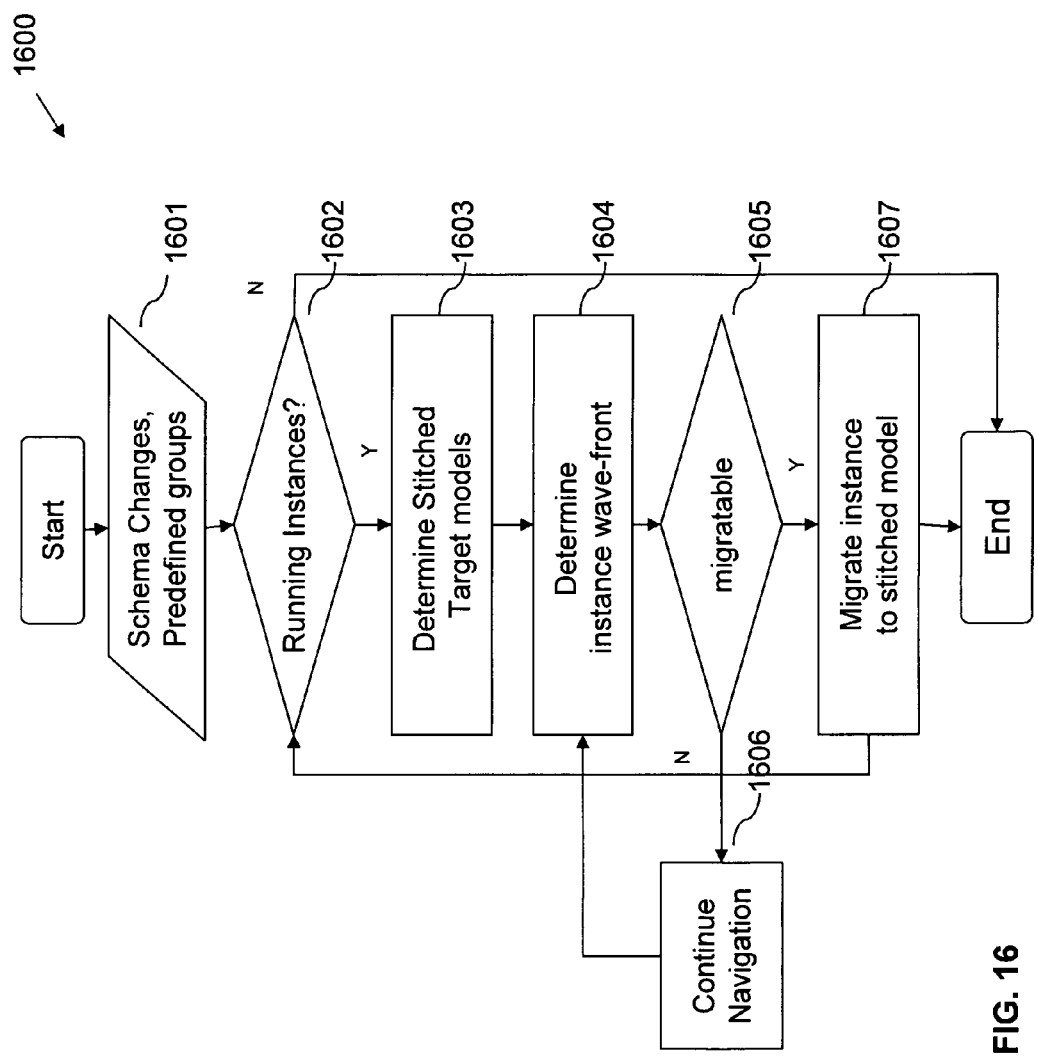
FIG. 16 shows, as an example, a flowchart of a method in accordance with an embodiment of the present invention.

FIG. 16 shows, as an example, a flowchart of a method 1600 for migrating process instances in accordance with an embodiment of the present invention. In step 1601, the workflow system receives the following information as input: template changes and grouping information. The template changes describe what has to be changed in the old template to get to a new template. The grouping information defines, as discussed above, for example group boundaries or lists group members.

In step 1602, the workflow system checks, if running instances associated with the old template exist in the instance data store 106. The workflow system may especially check whether the existing running instances are intended for migration. "Intended for migration" in this context means that the user intents to migrate the instance. For example, in schema evolution scenarios all running instances are to be migrated to a stitched model. In ad-hoc scenarios, on the other hand, only one instance is migrated to a stitched model. If no such instance exists in step 1602, nothing has to be done. The method 1600 thus ends after step 1602.

If there are instances intended for migration in step 1602, the workflow system determines in step 1603 the possible target stitched models based on the old template, the changes that have to be applied and the grouping information.

Step 1603 may occur implicitly or explicitly at a different point in time. An example for implicit creation of a stitched model is to navigate a process instance up to a predefined wave-front and just continue navigation based on a new template from there. The stitched model is not calculated explicitly but the log files contain information that the instance has been navigated based on this certain stitched model. Explicitly calculated stitched models are useful in scenarios where the user wants to validate the potential target template in the editor or if he wants to decide manually during runtime if an existing instance should be migrated. For example, the possible target stitched models may be determined directly after step 1601, before checking in step 1602 whether process instances to be migrated currently exist.

For each process instance to be migrated, the system determines in step 1604 the current instance wave-front and checks in step 1605, if the instance is migratable to one of the possible target stitched models. An instance is migratable to the stitched model defined by current wave-front of the instance (that is, a current state of the instance) if the stitched model contains either all or none of the changes of each group, i.e. there exists no group of changes that crosses the wave-front. Note that a well-defined stitched model exists for each instance and each change applied to the old template, so that each running instance can always be migrated to a stitched model.

If the process instance can be migrated, the system migrates it in step 1607 and continues with the next running instance in step 1602, if there exists a further process instance. If an instance cannot be migrated in step 1605, the workflow system continues to navigate the instance in steps 1606, 1604, and 1605 until the instance is in a state, where it can be migrated in step 1607 to one of the predefined stitched models. Note that continuing navigation in step 1606 can involve heuristics, e.g., optimizations to speed up execution of paths needed to allow for migration, and delaying other paths that should not progress before migration. Other algorithms and optimizations are also conceivable, and they are not excluded from embodiments of the present invention.

It is appreciated that although FIG. 16 and the above description refer to wave-fronts, similar approach is possible also for migrating process instances based on grouping information defining explicitly activities belonging to each group of changes.

Figure 17:
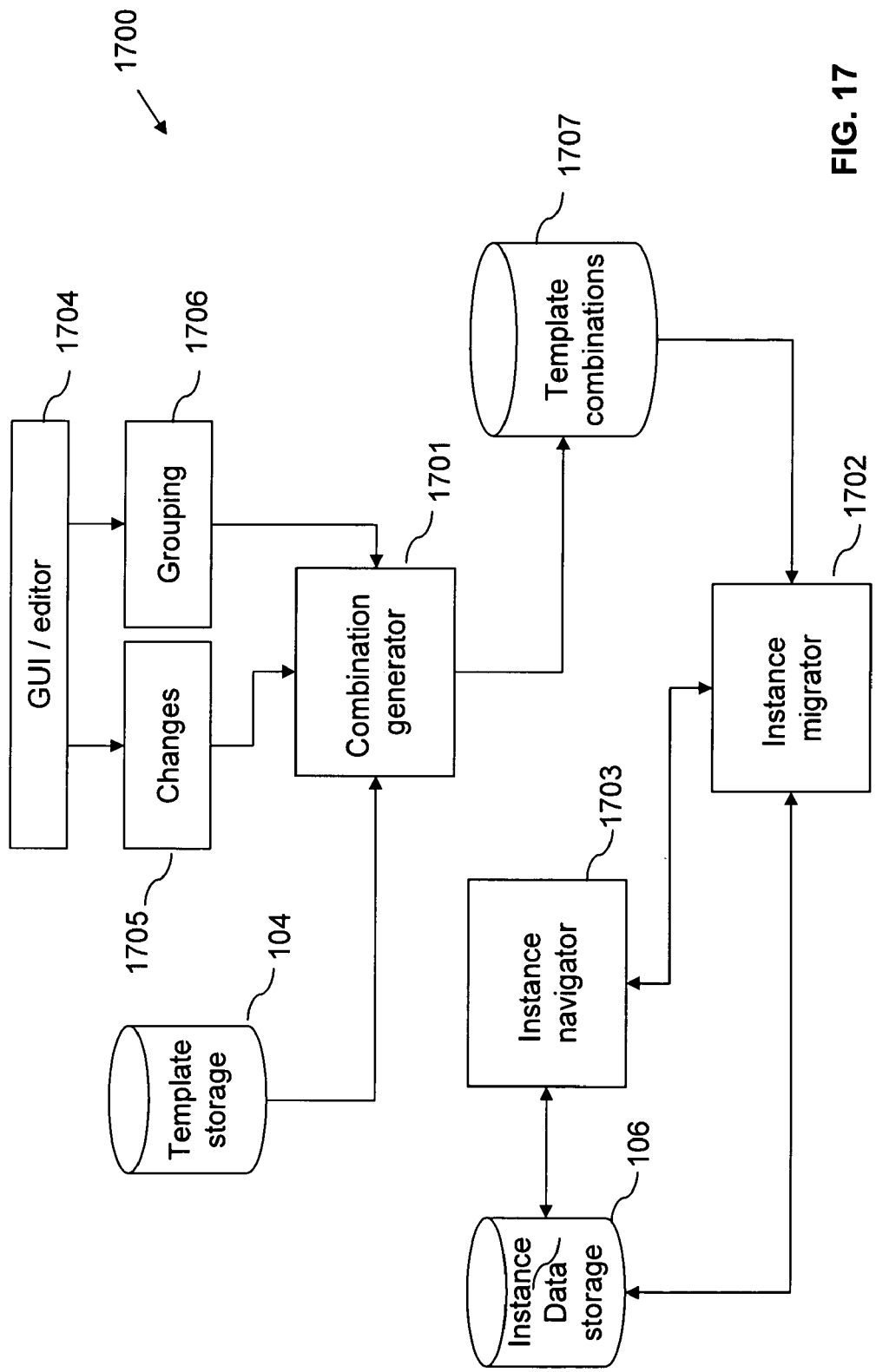
FIG. 17 shows one example of a system in which embodiments of the present invention can be implemented.

FIG. 17 shows one example of a data processing system 1700 in which embodiments of the present invention can be implemented. The system 1700 may be a workflow management system. The system 1700 contains a template storage 104 and an instance data storage 106. These storages may be similar to known template and instance data storages. A combination generator 1701 receives (step 1601) first input information 1705 describing changes between a first process template and a second process template. The combination generator 1701 receives also second input information 1706 describing grouping of the changes. These pieces of input information may be received, for example, via a graphical user interface 1704, an editor, or as a file. The combination generator 1701 determines (step 1603) a set of combinations (stitched models) 1707 of the first and second process template by applying the changes to the first process template in complete groups.

The data processing system 1700 has an instance migrator 1702 for migrating (step 1607) process instances to respective template combinations (stitched models). A respective template combination contains all possible future changes for an instance. An instance navigator 1703 navigates (step 1606) process instances further, in response to the instance migrator noticing that a current state of an instance crosses the associated groups of changes. The instance migrator 1702 and the instance navigator cooperate in order to navigate the process instances to states where they can be migrated to respective template combinations (stitched models).

Embodiments of the invention may have the following advantages. The input information describing the grouping of the changes allows automatically determining a set of valid combinations of the old and new templates. A user can provide this information, for example, by identifying changes belonging to each group or by drawing (partial) group boundaries using a GUI of a tool. User need not specify the possible combinations of the old and new templates, only the grouping of changes.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

This description explicitly describes some combinations of the various features discussed herein. It is appreciated that various other combinations are evident to a skilled person studying this description.

It is appreciated that in the appended claims the set of combinations of the first and second process templates may, but need not, contain all possible combinations of the first and second process models, where the changes have been applied in complete groups. It is possible, for example, to determine only the specific combination that corresponds to a current state of a given process instance. Thereafter, the process instance can be migrated to the specific combination.

In the appended claims a computerized method refers to a method whose steps are performed by a computing system containing a suitable combination of one or more processors, memory means and storage means.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A computerized method for migrating at least one process instance, the method comprising:
receiving first input information describing changes between a first process template and a second process template, wherein said first process template and said second process template contain nodes for navigating said at least one process instance through a workflow,
receiving second input information describing grouping of said changes, wherein said grouping defines complete groups of nodes and changes that must be executed atomically, and determining a set of stitched models of said first process template and said second process template by applying said changes to said first process template in complete groups as defined by said second input information,
selecting a stitched model from the set of stitched models containing complete groups of changes defined by said second input information that affect only the future of said at least one process instance at the time of migration, and
migrating said at least one process instance of said first process template to said second process template according to the selected stitched model.

2. The method of claim 1, further comprising determining for said at least one process instance of said first process template whether a current state of said at least one process instance crosses groups of changes defined by said second input information.

3. The method of claim 2, further comprising navigating said at least one process instance of said first process template to a further state without crossing any one of said groups of changes.

4. The method of claim 3, wherein said second input information defines at least all changes belonging to each group of changes.

5. The method of claim 1, wherein said second input information defines at least one partial group boundary.

6. The method of claim 5, wherein said at least one partial group boundary is defined by at least one set of concurrently navigatable activities.

7. The method of claim 6, further comprising determining at least one group boundary extending across said first process template based on said at least one partial group boundary.

8. The method of claim 7, further comprising determining, for each group boundary extending across said first process template, a respective stitched model of said first process template and said second process template.

9. The method of claim 8, further comprising providing a graphical user interface for inputting at least one of said first input information and said second input information.

10. The method of any claim 9, further comprising receiving said first input information and said second input information as one piece of input information.

11. A data processing system, comprising
a template storage for storing at least a first process template;
a combination generator for receiving first input information describing changes between said first process template and a second process template, wherein said first process template and said second process template contain nodes for navigating at least one process instance through a workflow, and for receiving second input information describing grouping of said changes, wherein said grouping defines complete groups of nodes and changes that must be executed atomically, said combination generator configured to determine a set of stitched models of said first process template and said second process template by applying said changes to said first process template in complete groups as defined by said second input information; and
an instance migrator for selecting a stitched model from the set of stitched models containing complete groups of changes defined by said second input information that affect only the future of said at least one process instance at the time of migration, and migrating said at least one process instance of said first process template to said second process template according to the selected stitched model.

12. The data processing system of claim 11, further comprising an instance navigator for navigating process instances further, wherein said instance migrator is configured to check whether a current state of said at least one process instance crosses groups of changes defined by said second input information and, in response to said at least one process instance crossing at least one group of changes, to cooperate with said instance navigator for navigating said at least one process instance further.

13. A computer program product comprising computer-usable storage medium having stored therein computer usable program code for migrating at least one process instance, the computer usable program code, which when executed by a computer hardware system, causes the computer hardware system to perform:
receiving first input information describing changes between a first process template and a second process template, wherein said first process template and said second process template contain nodes for navigating said at least one process instance through a workflow,
receiving second input information describing grouping of said changes, wherein said grouping defines complete groups of nodes and changes that must be executed atomically, and
determining a set of stitched models of said first process template and said second process template by applying said changes to said first process template in complete groups as defined by said second input information,
selecting a stitched model from the set of stitched models containing complete groups of changes defined by said second input information that affect only the future of said at least one process instance at the time of migration, and
migrating said at least one process instance of said first process template to said second process template according to the selected stitched model.

* * * * *